March 19, 1963
G. R. PIPES
3,081,904
DEFORMABLE CLOSURE DEVICE
Filed Oct. 23, 1959
2 Sheets-Sheet 2
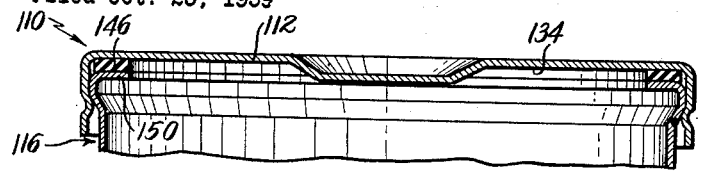
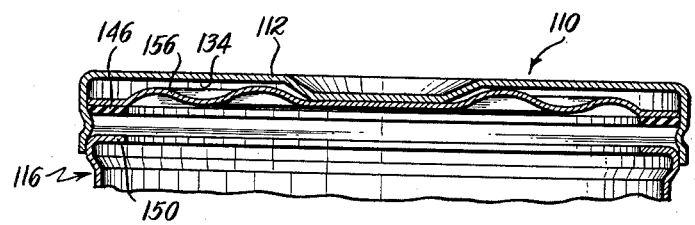
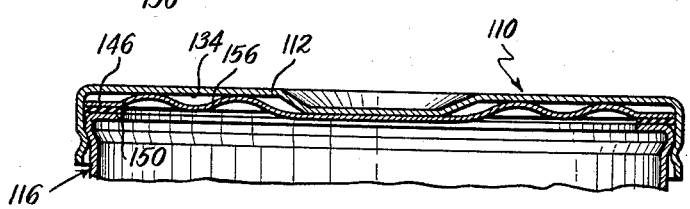
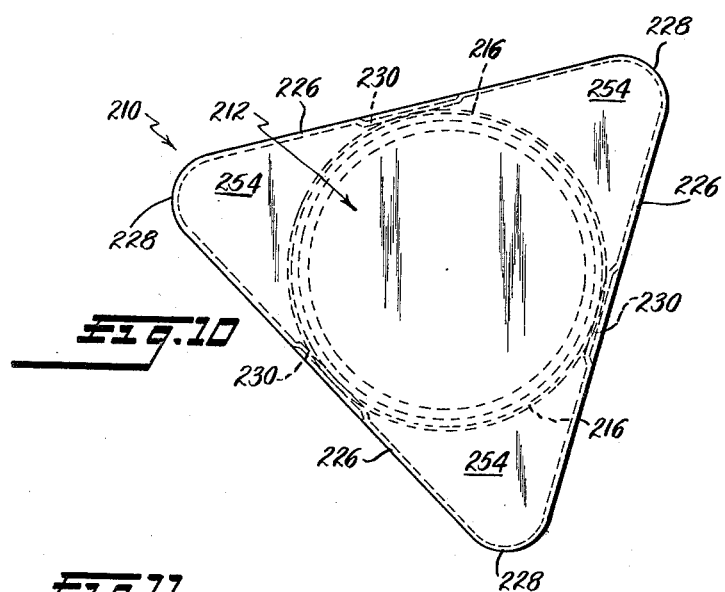
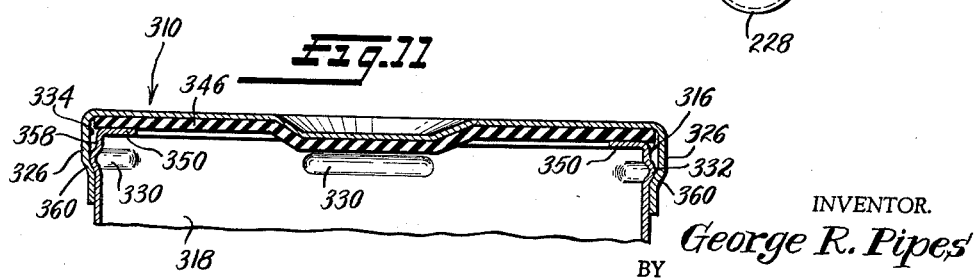
INVENTOR.
George R. Pipes
BY
Teagno & Stover
ATTORNEYS

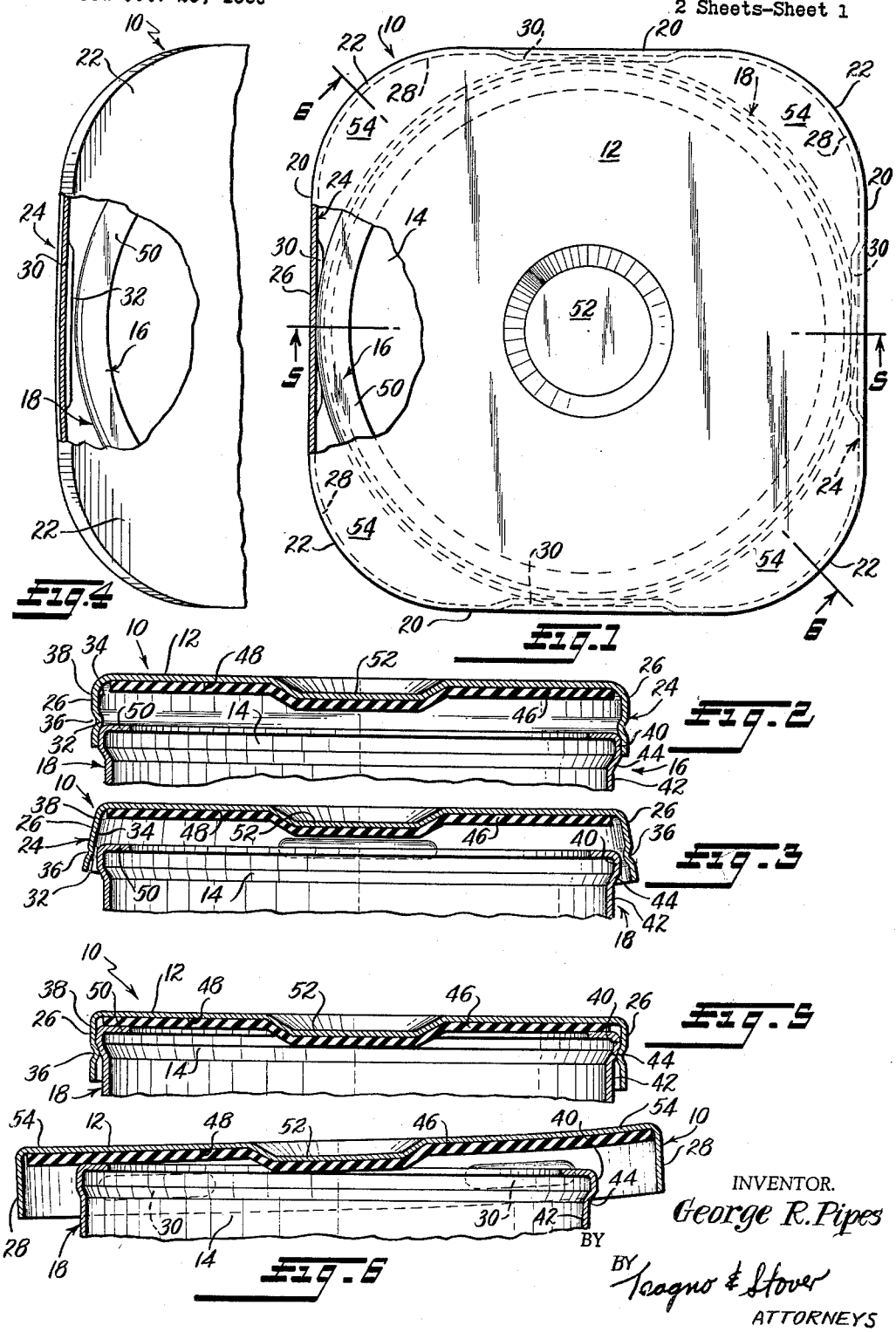

United States Patent Office 3,081,904
Patented Mar. 19, 1963

3,081,904
DEFORMABLE CLOSURE DEVICE
George R. Pipes, South Euclid, Ohio, assignor to Eaton Manufacturing Company, Cleveland, Ohio, a corporation of Ohio
Filed Oct. 23, 1959, Ser. No. 848,352
5 Claims. (Cl. 220—60)

This invention relates to a flexible and/or deformable closure device such as a removable and reusable cap or cover which closes an open end of a flange member such as a filler pipe commonly employed in connection with tanks, various types of other containers, or any other type of opening defined by a flange portion.

Closure devices for filler pipes or containers having flanged openings may be generally classified into three different types insofar as the manner and method of their connection to the flanged opening of the filler pipe or container is concerned. The most common is the screw or thread type in which the closure device is threaded onto a mating portion of the flanged opening. Another is the bayonet type in which the closure device is properly provided with lugs which fit through slots in the end of the flanged opening to secure the closure device thereto by engagement with an abutment when the closure device is rotated relative to the flanged opening after the lugs are passed through the slots. The third type is the push-on or snap type closure device which has flexible and/or deformable skirt portions which are adapted to snugly fit over and frictionally engage enlargements normally positioned on the flanged opening and which co-operate to removably secure and retain the closure device on the flanged opening.

Although the push-on or snap type closure devices are usually simpler to manufacture and require less manipulation when placed, removed and/or replaced onto the object to be covered or closed thereby, such closure devices have not heretofore proved entirely satisfactory, so that the screw or bayonet type closure devices have been favored in most instances. For example, the various forms of push-on or snap type closure devices previously employed have generally been either difficult to remove and replace from the receiving object or, if easily removed, they are lacking in sealing quality or they are destroyed on removing and not reusable.

Various attempts have been made to solve such difficulties, as stated above, by providing a push-on or snap type closure device with lifting tabs, handles or the like, but in each instance, while adding to the cost of the closure device, such modifications have not made the manipulation of the closure device substantially more convenient, nor do they reduce the amount of force required to place, remove or replace the closure device.

Further, in most instances, the push-on or snap type closure devices now being used rely upon a skirt portion that is annular or which includes a plurality of arcuate sections and in each of these instances, the curved configuration of the skirt creates a definite undesired resistance to any deformation or flexing of the skirt and any resulting distortion, flexing and/or deformation which may be given to an annular arcuate section will not be localized and will extend throughout the full periphery of the section which makes it more difficult to place, remove or replace the closure device relative to the flange of the object being closed.

It is therefore the principal object of this invention to provide an improved push-on or snap-type closure device which is economical to manufacture, durable in use, reusable, convenient to manipulate, easily placed, removed and replaced on the associated receiving object, and which when properly positioned and placed on the receiving object effects and maintains a desired tight seal and closure therefore which will effectively retain a moderate amount of positive pressure from within the receiving object that is sealed and closed by the improved closure device.

Another object of this invention is to provide an improved flexible and/or deformable closure device for closing an opening in a receiving object with contact means which engage the receiving object at a plurality of spaced locations thereon together with means for flexing and/or deforming a localized part of the closure device to disengage the contact means from the receiving object to facilitate the placing, removing and replacing of the closure member relative to the receiving object.

A further object of this invention is to provide an improved push-on or snap type closure device, which may be positioned on a container to close an opening therein, with a plurality of spaced apart substantially straight flexible and/or deformable portions which engage the container together with means disposed intermediate the straight portions in spaced relationship to the container for deforming the straight portions to enable the closure device to be easily placed, retained, removed and replaced on the container in the closing position.

A still further object of this invention is to provide a closure device that includes an endless skirt member having a plurality of spaced apart, flexible and/or deformable, substantially linear planar portions with an easily operable releasing means for flexing and/or deforming the portions of the closure device to enable the closure device to be readily placed, removed and replaced on a flanged opening without destroying the device with the easily operable releasing means being defined by that part of the endless skirt which is intermediate the portions with the releasing means being positioned in generally radial or laterally outwardly spaced relationship to the flanged opening when the closure device is in an operable closure position so that a given force which is exerted on the releasing means in a direction that is generally longitudinal or substantially normal to the plane in which the closure device is disposed in the closure position will flex or deform the portions and move the portions in directions that are substantially normal to the direction of the given force to positions which are disposed generally outwardly relative to the flanged opening to enable the closure member to be placed, removed or replaced, as stated above.

An additional object of this invention is to provide an improved closure device for closing a substantially annular opening defined by a flange member with an endless non-annular skirt member including flexible and/or deformable portions having frictional contact means which engage the wall of the flanged opening at space intervals therealong.

A more detailed object of this invention is the provision of an improved push-on or snap type closure device of polygonal configuration which is adapted to close an annular opening defined by a substantially cylindrical flange with the closure device having flexible and/or deformable portions which engage the flange at circumferentially spaced locations thereon.

In order to overcome the above noted disadvantages and objections to the existing types of flexible and/or deformable closure devices and to accomplish the objects as stated above, the improved flexible and/or deformable closure device of the instant inventive concept includes a substantially flat flexible and/or deformable main body portion which is adapted to cover or close an opening formed by a flange portion of a receiving object and an endless or continuous member that depends from the main body portion with the endless or continuous member being disposed generally normal to the flat portion of the closure device. The endless or continuous member is provided with a plurality of elongated, spaced apart, substantially straight, linear planar, flexible and/or deformable side portions each of which has contact means disposed thereon with the contact means being positioned at spaced locations along the endless or continuous member so that the contact means will engage the annular flange portion of the receiving object at spaced intervals therealong. The closure device is also provided with a releasable means for urging the side portions and the contact means to a generally radial or lateral outward position relative to the normal position of the side portions so that the contact means may be spaced from the flange portion of the receiving object. The releasable means is defined by that part of the endless or continuous member which is intermediate adjacent contact means with the side portions extending away from the flange portion of the receiving object at the locations where the contact means engages the flange portion so that the releasable means is generally radially or laterally outwardly spaced from the flange portion and effective to flex and/or deform the side portions and so position the contact means to facilitate the placing, removing and replacing of the closure device on the receiving object.

Other objects and important features of the invention will be apparent from a study of the specification which follows taken with the drawing which together illustrate and describe a number of preferred embodiments of the invention and what are now considered to be the best modes of practicing the principles thereof. Other embodiments of the invention may be suggested to those having the benefit of the teachings herein, and such other embodiments are intended to be reserved especially as they fall within the scope of the sub-joined claims.

In the drawings:

FIGURE 1 is an enlarged plan view of one modification of the improved closure device positioned in place on a receiving object with a portion of the closure device being broken away to illustrate the action of the friction contact means;

FIGURE 2 is a lateral sectional view in elevation of the closure device shown in FIG. 2 illustrating the position thereof either prior to being placed onto or after the removal from the receiving object;

FIGURE 3 is a lateral sectional view, similar to FIG. 2, showing the closure device in an intermediate position either in placing or removing same from the receiving object with certain portions of the closure device being flexed and/or deformed to facilitate such positioning;

FIGURE 4 is a partial plan view of FIG. 3 illustrating the flexing and/or deformation of the straight portions of the closure device from the normal position thereof, as illustrated in FIG. 1, to a second position that is generally outwardly spaced from such normal position.

FIGURE 5 is a lateral sectional view, similar to FIGS. 2 and 3, taken along the line 5—5 of FIG. 1, looking in the direction of the arrows;

FIGURE 6 is a diagonal sectional view in elevation taken along the line 6—6 of FIG. 1 and illustrating the position of the closure device in the intermediate position, as illustrated in FIG. 3, while placing or removing same from the receiving object;

FIGURE 7 is a lateral sectional view in elevation of a modification of the improved closure device positioned in place on the receiving object.

FIGURE 8 is a lateral section view in elevation of another modification of the closure device positioned either prior to being placed onto or after being removed from the receiving object;

FIGURE 9 is a lateral sectional view in elevation of the modified closure device illustrated in FIG. 8 showing the closure device positioned in place on the receiving object;

FIGURE 10 is a plan view, similar to FIG. 1 of a still further modification of the improved closure device, and FIGURE 11 is a lateral sectional view in elevation showing a modification of the contact means for retaining the closure device positioned in place on the receiving object.

Attention is now directed to FIGS. 1 through 6 of the drawing wherein there is illustrated a closure device 10 in the form of a four sided polygon with the closure device 10 having a substantially flat, flexible and/or deformable main body portion 12 for covering and/or closing an annular opening 14 defined by a generally axially extending substantially cylindrical flange portion 16 of a receiving object, such as a filler pipe 18, of a tank or container, not shown. The main body portion 12 of the closure device 10 is polygonal in configuration having a generally square shape and a plurality of substantially straight peripheral side edges 20 which are joined at rounded corners 22, note FIG. 1. The overall side edge dimension of the main body portion 12 is slightly greater than the maximum diameter of the flange portion 16 of the filler pipe 18 and the rounded corners 22 are of a sufficiently small curvature, that is, a radius of curvature considerably less than one-half the overall side edge dimension of the main body portion 12, so that the corners 22 are each located generally radially outwardly in laterally spaced relationship to the flange portion 16.

Extending around the entire periphery of the main body portion 12 is a downwardly turned flexible and/or deformable endless or continuous skirt member 24 which depends generally from the main body portion 12, as viewed in FIGS. 2, 3, 5 and 6, in a direction generally normal thereto. The endless skirt member 24 is preferably formed integral with the main body portion 12 and includes a plurality of substantially straight linear planar flexible and/or deformable portions 26 each of which is disposed adjacent to one of the side edges 20 of the main body portion 12 and a plurality of curved portions 28 each of which is disposed adjacent to one of the corners 22.

As best seen in FIGS. 1 to 6, friction contact means 30, in the form of a generally horizontally disposed inwardly extending protrusion or detent 32, is provided intermediate the curved portions 28 on each of the straight portions 26 with the contact means 30 being positioned at substantially equally spaced locations along the endless skirt member 24 for engagement with the flange portion 16 at spaced intervals therealong. The contact means 30 is formed on the inner surface 34 of each straight portion 26 of the endless skirt member 24 by creating a relatively longitudinally short indentation 36 in the outer surface 38 thereof. Each of the contact means 30 is located generally longitudinally centrally with respect to the length of the respective straight portion 26 and spaced some distance downwardly thereon from the main body portion 12.

The flange portion 16 of the filler pipe 18 is provided, as best seen in FIGS. 2, 3, 5 and 6, with a generally cylindrical first annular surface 40 adjacent the opening 14 and with a generally cylindrical second annular surface 42 of lesser diameter than the first annular surface 40. The second annular surface 42 is positioned axially inwardly from the first annular surface 40 in a direction away from the opening 14 and the first 40 and second 42 annular surfaces are connected by an axially curved annular surface 44. With the closure device 10 in place, note FIG. 5, the depending endless skirt member 24 of the closure device 10 is so dimensioned that the contact means 30 formed on each of the straight portions 26 extends axially beyond the first annular surface 40 and overlies the second annular surface 42 in engagement with the curved annular surface 44 at spaced intervals therealong.

A resilient sealing material 46, such as a synthetic rubber or the like, may be attached, by an adhesive or other means, to the undersurface 48 of the main body portion 12 to provide an effective seal between the closure device 10 and the flange opening 16. In the modification of the improved closure device as illustrated in FIGS. 1–6, the sealing material 46 is in the form of a disc of sufficient size to cover substantially the entire undersurface 48 of the main body portion 12. However, in the modification of the closure device as illustrated in FIG. 7 and the modification of the closure device as illustrated in FIGS. 8 and 9, each to be more fully disclosed and described hereinafter, it is to be noted that the sealing material may be in the form of an endless annular ring 146. Preferably, the spacing between the contact means 30 and the sealing material 46 or 146 is such, as compared with the spacing between the curved annular surface 44 and the opening 14 of the flange portion 16, that the sealing material 46 or 146 will be pressed against the end of the flange portion 16 and, if desirable, the end of the flange portion 16 may also be provided with an inturned flange 50 to more effectively create a better seal between the flange portion 16 and the closure device 10.

The main body portion 12 and the endless skirt member 24 of the closure device 10 are both preferably made of a suitable yieldable, flexible and deformable material, such as sheet metal, plastic or the like, which is of sufficient thinness to permit and enable flexing and/or deformation thereof by manually exerted pressure. More specifically, the flexible and/or deformable portions 26 are normally disposed and positioned substantially perpendicular to the main body portion 12, note FIGS. 2, 3, 5 and 6, and the material and thickness of the main body portion 12 and the portions 26 are so selected that the depending portions 26 may be flexed and/or deformed generally outwardly away from the normal position by a force which may be applied by hand to the corners 22 of the closure member 10 generally upwardly in a direction that is substantially normal to the plane of the main body portion 12 in a manner to be explained in more detail hereinafter, so that the contact means 30 on each of the straight portions 26 will move to a second position that is generally lateral or outward relative to the normal position thereof into radially spaced relationship to the annular surfaces 40, 42 and 44 of the flange portion 16, note FIGS. 3 and 4. To assist in this flexing and/or deformation of the straight portions 26, the main body portion 12 of the closure device 10 may be provided with a centrally located depression 52 which tends to decrease the amount of force required to be exerted generally normal to the main body portion 12 to achieve a given flexure or deformation and which also provides a convenient hold for the thumb while grasping one of the corners 22 by the fingers.

Each of the straight portions 26 extends away from the flange portion 16 at the respective location thereon where the contact means 30 is in engagement therewith, note FIGS. 1 and 4, so that each of the corners 22 is generally radially outwardly positioned in laterally spaced relationship to the flange portion 16 to define releasable means 54 which is operable to flex and/or deform the adjacent straight portions 26 to urge the respective contact means 30 from the normal position to the second position at the locations of engagement with the flange portion 16 to facilitate the placement, removal and replacement of the closure device 10 to the flange portion 16.

In operation, i.e. while either retaining, placing, removing or replacing the closure device 10 relative to the flange portion 16, as illustrated in FIGS. 2, 3, 5 and 6, the main body portion 12 and the substantially straight depending portions 26 are flexed and/or deformed from the normal position to a second position wherein the main body portion 12 is generally concave or generally dished and inwardly depressed, note FIG. 6, and the straight portions 26 and the contact means 30 are positioned in the second position generally radially outwardly in laterally spaced relation to the normal position and to the flange portion 16, note FIGS. 3 and 4, and that this second position will enable the closure device 10 to be easily placed, removed and subsequently replaced on the flange portion 16. The flexing and/or deformation of the substantially straight depending portions 26 is provided by a force applied to a selected one of the releasable means 54 which is defined by the corners 22 so that the straight depending portions 26 that are immediately adjacent to the selected releasable means 54 will flex and/or deform from the normal position to the second position. It will also be understood that in placing, removing and replacing the closure device 10 relative to the flange portion 16 that one or more of the straight depending portions 26 should be flexed and/or deformed from the normal position to the second position in which the contact means 30 is urged to the second position to permit the contact means 30 to pass over the first annular surface 40. Normally, such flexing and/or deformation would require a relatively large force to be applied to the closure device 10. However, in the present instance, it is to be noted that each of the straight depending portions 26 is engaged by the flange portion 16 along only a longitudinally small part of its extent with the remaining part of each straight depending portion 26 extending away from the flange portion 16 so that the releasable means 54 which is defined by the corners 22 is relatively free to flex and/or deform since the remaining part of each of the straight portions 26 and the corners 22 which define the releasable means 54 is unrestrained by having no contact with the flange portion 16 which would otherwise exert forces on the endless skirt member 24 and oppose the deformation thereof.

Further, it is to be noted that the contact means 30 is located on that part of the respective flexible and/or deformable portion 26 which is substantially straight and generally tangentially disposed relative to the flange portion 16 so that there is a minimum of resistance created which acts against the flexing and/or deformation of the straight portions 26 during the movement from the normal position to the second position.

Attention is now directed to FIGS. 8 and 9 of the drawing wherein a modification of an improved closure device 110 is illustrated and it is to be noted that in addition to the structure previously disclosed and described above in regard to the modification of FIGS. 1 to 6, that this modification further includes a resilient diaphragm member 156 which is disposed intermediate the innersurface 134 of the main body portion 112 and the inturned flange 150 of the flange portion 116 to more effectively perfect the seal between the sealing material 146 and the flange portion 116 with the closure device 110 being illustrated as removed from the flange portion 116 in FIG. 8 and in the closure position as viewed in FIG. 9.

Attention is now directed to the modification of the invention as illustrated in FIG. 10 wherein a closure device 210 in the form of a three sided polygon is illustrated with the closure device 210 having a flexible and/or deformable main body portion 212 which is substantially in the form of an equilateral triangle, a flexible and/or deformable endless skirt member defined by substantially straight portions 226 which depend from the side edges of the main body portion 212 and curved portions 228 which join adjacent straight depending portions 226. Contact means 230 is provided on each of the straight portions 226 at locations thereon that are intermediate the curved portions 228 for engaging the flange portion 216 at spaced intervals therealong. Further, releasable means 254 is defined by each of the corners of the closure device 210 and each of the releasable means 254 is disposed generally radially outwardly in laterally spaced relation to the flange portion 216 so as to flex and/or deform the straight depending portions 226 into the second position which will urge the contact means 230 from the normal position to the second position, as disclosed above in the description of the modification of the closure device as illustrated in FIGS. 1 to 6, and enable the closure device 210 to be placed, removed, and replaced upon the flanged portion 216.

In the modification of a closure member 310, as illustrated in FIG. 11, a flange portion 316 of a filler pipe 318 is provided with contact means 330 which includes radially outwardly or laterally outwardly projecting protrusions or detents 332 which are circumferentially spaced at locations along the outer surface 358 of the flange portion 316. It is to be noted that the outer surface 358 of the flange portion 316 is of a different configuration than that configuration previously disclosed and described in the other modifications of this invention. The outer surface 358 of the flange portion 316 is substantially cylindrical in configuration except for the protrusions or detents 332 which will engage an axially arcuate annular surface 360 on the inner surface 334 of the depending straight portions 326 of the closure device 310 at spaced intervals therealong and effectively position a sealing material 346 against a flange 350 of the flange portion 316. In operation, the depending straight portions 326 of the closure device 310 will flex and/or deform generally laterally outwardly from the normal position to the second position in laterally spaced relationship to the protrusions or detents 332 of the flanged portion 316 to facilitate the placing, removal or replacing of the closure device 310 on the flange portion 316.

It is to be noted and understood that the sealing material 46, 146 or 346 and/or the diaphragm member 156 may be used in each of the modifications and that, in each instance, the sealing material and diaphragm member will be disposed within the confines of the respective endless skirt member.

While each of the modifications of the invention as described and disclosed above are generally of polygonal configuration with substantially straight linear planar flexible and/or deformable depending portions which are disposed tangentially to the annular flange of the opening so that the endless skirt member, in effect, circumscribes the annular flange portion of the receiving object, it is to be understood that other configurations, not illustrated, may be used wherein the closure device is not generally polygonal in configuration, and without the locations at which the contact means engages the annular flange of the opening being substantially equally circumferentially spaced. In actual practice, it has been found that the most economical construction which results in the substantially straight portions 26 of the endless skirt member 24 having the maximum amount of flexibility and/or deformability and with the minimum amount of resistance to such flexing and deformation is that modification as illustrated in FIGS. 1–6 wherein the configuration of the closure device is substantially square, as seen in plan view, with rounded corners. The desired structural features and conditions which are common to all possible modifications of the closure device are that the closure device should have a flexible and/or deformable endless member that includes at least two substantially straight linear planar portions that engage the flange of the opening at spaced locations therealong with that part of the flexible and/or deformable member which is intermediate the locations of engagement being in spaced relationship to the flange of the opening so that a localized flexing and/or deformation of the straight portions may be acquired at the locations of engagement as a result of a force which may be applied to the closure device in a given direction that is generally normal to the plane of the closure device with such flexing and deformation of the straight portions being in a direction that is generally normal to the given direction of such force with each of the straight portions moving from the normal position to the second position to facilitate the placement, removal, and replacement of the closure device onto the flange which defines the opening to be closed.

While the invention has been described in terms of a number of preferred embodiments thereof, the scope is intended to be limited only by the claims here appended.

I claim as my invention:

1. In combination, a container having a flange member defining an annular opening and a closure device for closing the opening, said closure device including an endless flexible member having substantially linear planar side portions thereon in engagement with the flange member at spaced locations therealong, one of said members having contact means adapted to engage the other member at the said locations for retaining the closure device on the flanged member, said flexible member having a part thereof intermediate the said locations disposed in laterally spaced relationship to the flanged member and defining means for deforming the flexible member to disengage the contact means from the said other member at the said locations to enable the closure device to be readily removed, placed, and replaced relative to the flanged member.

2. In a container having a flange portion defining an opening, the improvement comprising, in combination with the flange portion, a closure member for closing the opening, said closure member including a main body member having a plurality of elongated deformable substantially linear planar side portions depending therefrom, each of said side portions having a flange engaging contact means on the intermediate portion thereof for engagement with the flange portion to retain the closure member thereon to close the opening therein, and means joining the end portions of adjacent deformable side portions with said main body member to define a plurality of corner portions each disposed in generally laterally outwardly spaced relationship relative to the flange portion, said corner portions being operable to deform the deformable sides that are adjacent thereto and reposition the contact means associated therewith away from the flange portion.

3. In a container having an annular flange defining a substantially circular opening, the improvement comprising, in combination with the annular flange, a closure member for closing the opening, said closure member including a main body portion having a plurality of substantially straight flexible side portions depending therefrom each having a part that is disposed generally tangentially to the annular flange, each of said parts having contact means adapted to be positioned in engagement with the annular flange at circumferentially spaced locations therealong to retain the closure member on the annular flange to close the circular opening, the remaining part of each flexible side portion extending laterally away from each of the respective locations, and means joining the adjacent remaining parts of the flexible side portions with said main body portion, said means being disposed in generally radially outwardly spaced relationship to the annular flange for deforming the said parts of the flexible portions to reposition the contact means generally radially outwardly relative to the annular flange at the said locations.

4. In combination with a container having an annular opening defined by a flange, a closure member including a main body portion having at least two deformable side portions depending therefrom with each side portion having a substantially straight part disposed tangentially to such flange, each of said tangential parts having contact means adapted to engage such flange at spaced intervals therealong, the remaining part of each deformable side portion extending laterally from the respective contact means and joining with said main body portion to define releasing means adapted to be disposed in laterally spaced relationship to such flange when the closure member closes such opening, said releasing means being operable to facilitate the placement, removal and replacement of the closure member relative to such flange by deforming the deformable side portions to urge the contact means to be moved in a generally lateral outward direction relative to the closure member.

5. In combination with a container having an opening defined by a flange, a closure member including a main body portion having a flexible side portion of polygonal configuration depending therefrom and having contact means at spaced locations thereon adapted to engage such flange at spaced intervals therealong, said flexible portion having a part thereof intermediate adjacent locations and laterally spaced from said flange defining means for deforming the flexible portion of the closure member from a first position wherein the contact means may engage such flange to a second position wherein the contact means will be disengaged therefrom.

References Cited in the file of this patent

UNITED STATES PATENTS

| | | |
|---|---|---|
| 1,036,284 | Lippke et al. | Aug. 20, 1912 |
| 1,227,338 | Steffan | May 22, 1917 |
| 1,326,885 | Wales | Dec. 30, 1919 |
| 1,459,589 | Hoffman | June 19, 1923 |
| 1,505,265 | Hothersall | Aug. 19, 1924 |
| 1,605,708 | Clark | Nov. 2, 1926 |
| 1,643,009 | Gouffer | Sept. 20, 1927 |
| 1,693,150 | Malonyay | Nov. 27, 1928 |
| 2,024,227 | Jones | Dec. 17, 1935 |
| 2,026,463 | Driess | Dec. 31, 1935 |
| 2,104,540 | Hoffman | Jan. 4, 1938 |
| 2,109,805 | Stewart | Mar. 1, 1938 |
| 2,540,931 | Carvalks | Feb. 6, 1951 |
| 2,630,237 | Rosenlof | Mar. 3, 1953 |

FOREIGN PATENTS

| | | |
|---|---|---|
| 271,305 | Great Britain | May 26, 1927 |
| 313,070 | Great Britain | June 6, 1929 |
| 442,634 | Germany | Apr. 4, 1927 |